June 1, 1943. E. D. BOYLE 2,320,714
MOLD CHARGING APPARATUS
Filed Jan. 22, 1941   3 Sheets-Sheet 3
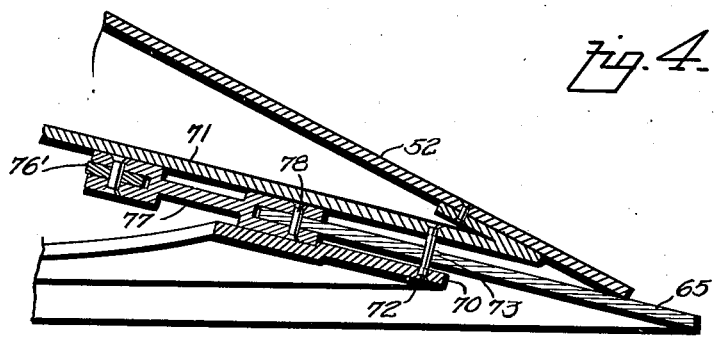
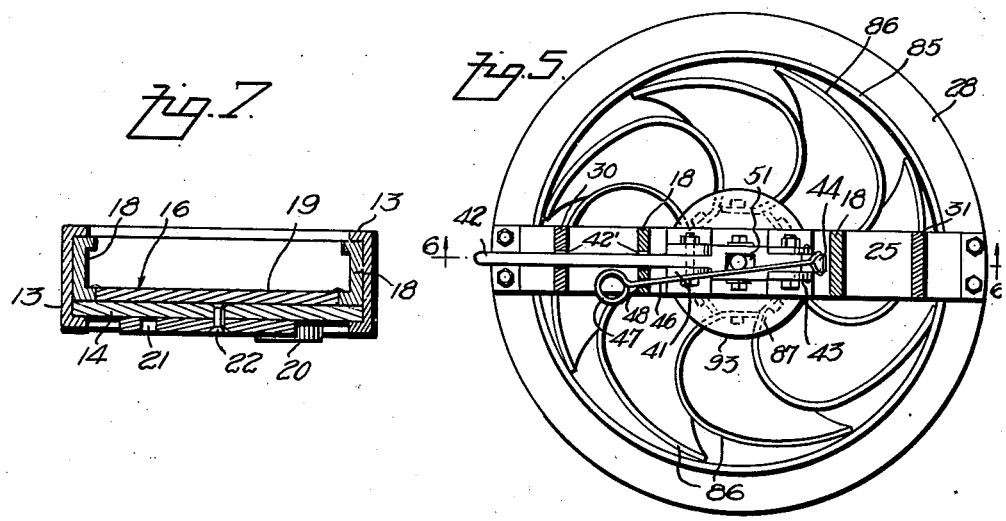
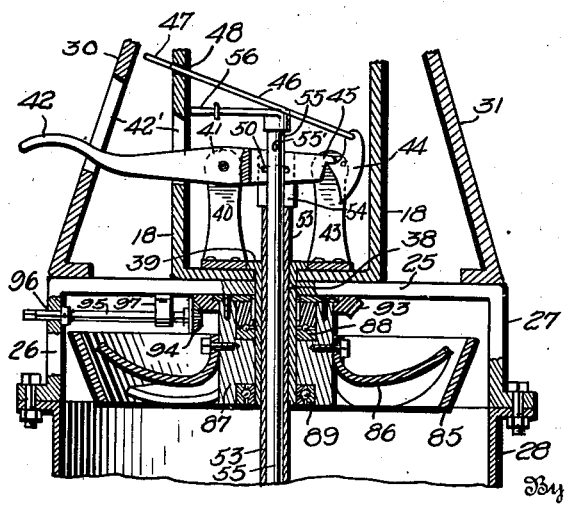
Inventor
E. D. Boyle
By
Attorney Patented June 1, 1943

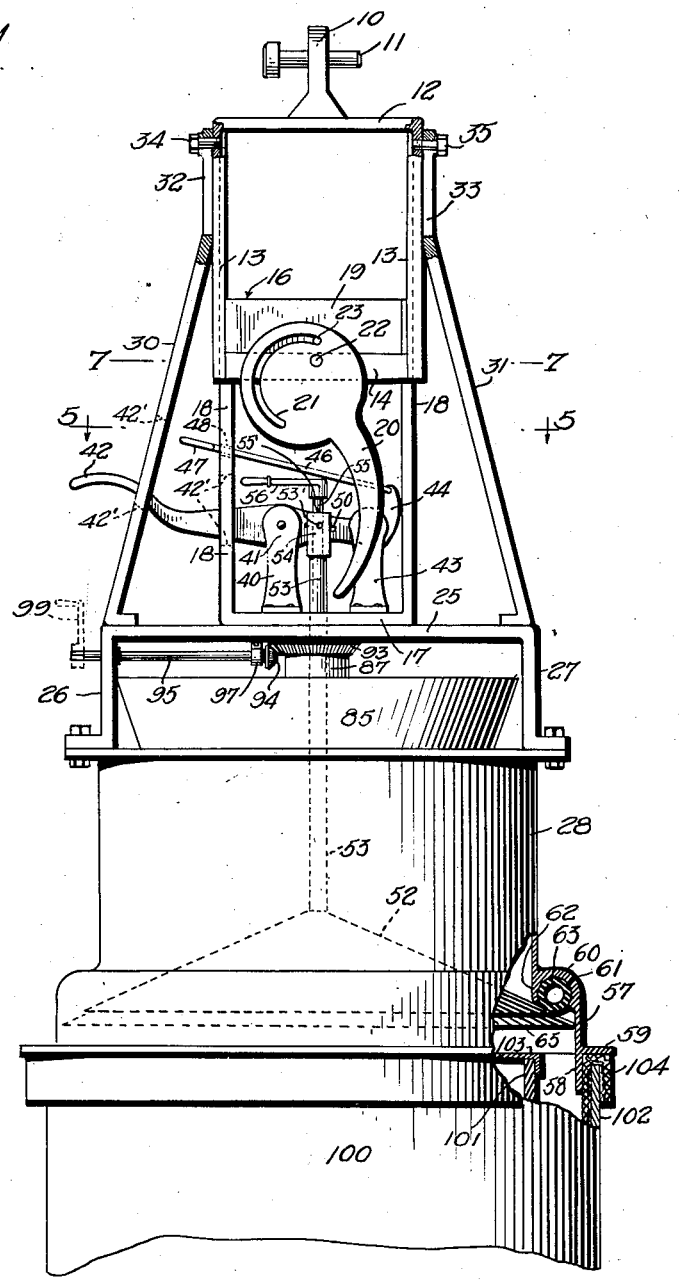

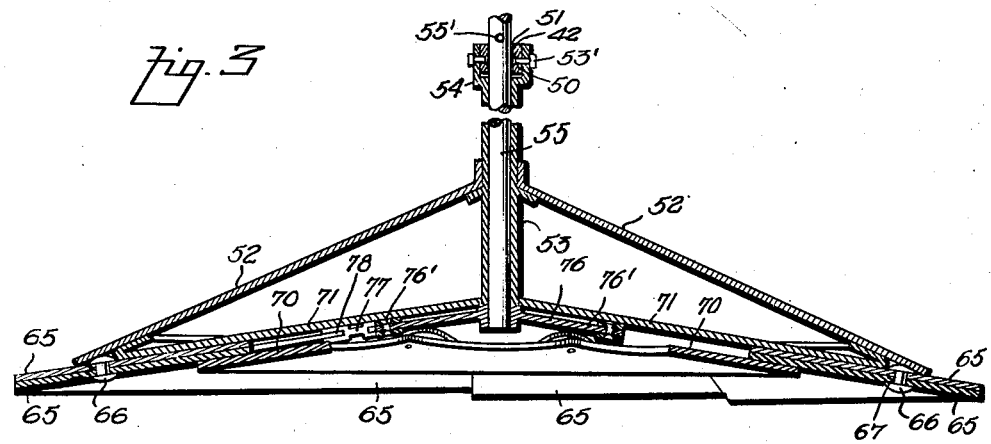
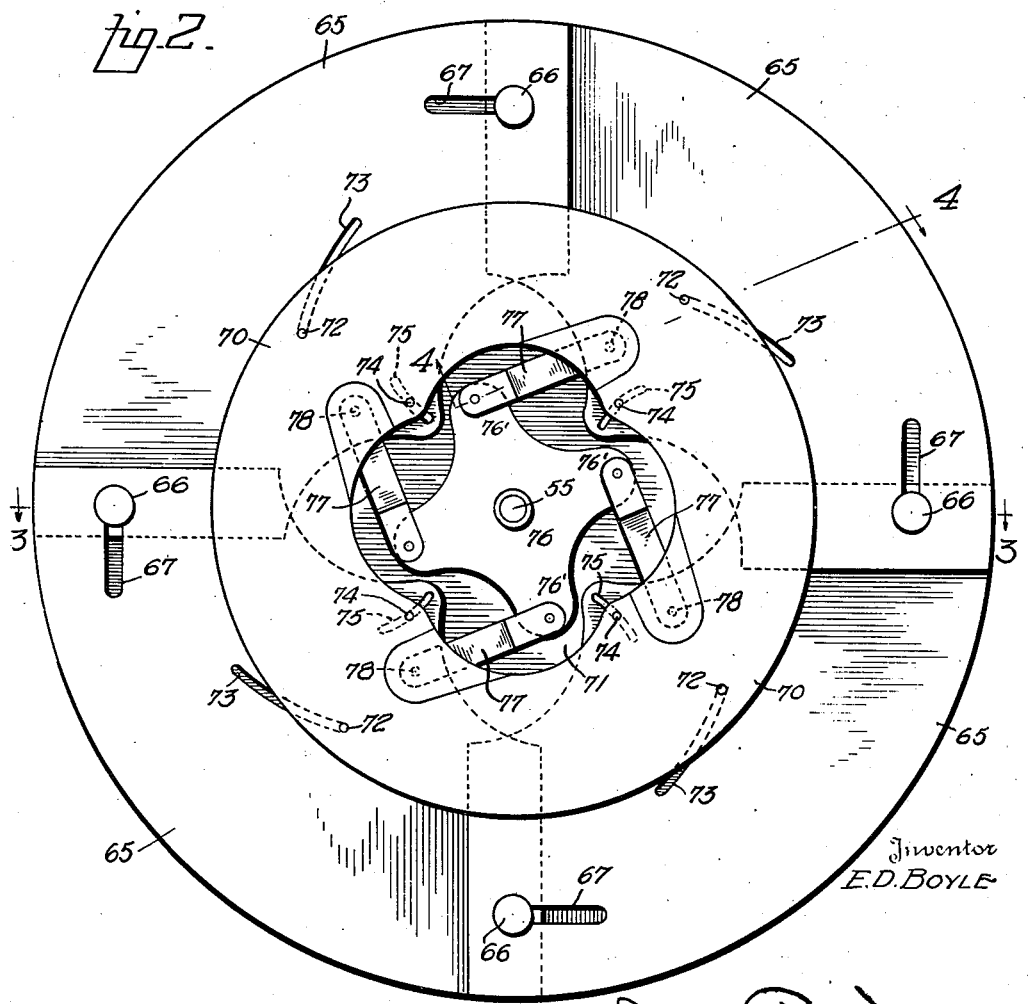

2,320,714

UNITED STATES PATENT OFFICE 2,320,714

MOLD CHARGING APPARATUS

Edward D. Boyle, Valdosta, Ga.

Application January 22, 1941, Serial No. 375,504

8 Claims. (Cl. 259—8)

This invention relates to mold charging apparatus and particularly the type used in molding pipes, tubular sections, etc. from concrete or other materials.

It is an important object of this invention to provide a mold charging apparatus of novel structure for transferring material to a mold without loss of material through pouring or overflow and in such a manner as to prevent or minimize the segregation of any elements of the mix.

Another important object of this invention is to provide a mold charging apparatus having a discharge cut-off means of novel structure by which the flow of the charging material may be regulated or arrested at will.

It is a further object to provide a mold charging apparatus including a charging bucket to which a compact even mass of material is delivered by novel distributing means thus preventing loss of time in the subsequent molding process by eliminating much of the normally required tamping or agitation of the charging material in the mold.

It is a further object to provide a mold charging apparatus of novel structure including means for lowering a charging bucket into position on a mold.

It is a further object to provide a mold charging apparatus including a plurality of means for regulating the flow of material into the mold.

It is a further object to provide a mold charging apparatus of novel construction which requires a minimum amount of time for the discharge of material into a mold.

Other objects and advantages of the invention will become apparent during the course of the following description.

In the drawings I have shown one embodiment of my invention. In this showing:

Figure 1 is a front elevation of the mold charging apparatus in charging position on the top of a pipe mold, parts being broken away and shown in section, Figure 2 is a bottom plan view of the conical charge cut-off means, Figure 3 is a vertical section taken on the line 3—3 of Figure 2, parts being shown in elevation, Figure 4 is a fragmentary vertical section on an enlarged scale taken on the line 4—4 of Figure 2, parts being shown in elevation, Figure 5 is a horizontal section taken on line 5—5 of Figure 1, parts being shown in plan, Figure 6 is a fragmentary central vertical sectional view on the line 6—6 of Figure 5, parts being shown in elevation, and, Figure 7 is an enlarged horizontal section taken on the line 7—7 of Figure 1.

Referring to the drawings, the numeral 10 designates a suspending bracket which is adapted to be connected to an overhead trolley (not shown) by means of a shackle pin 11. The bracket 10 supports a rigid outer frame comprising an inverted U-shaped channel structure 12 having downwardly extending legs 13 connected at their lower extremities by a plate 14 which is suitably secured to one pair of their lateral edges (Figures 1 and 7). Mounted for sliding movement in the vertical channels 13 is an inner frame 16 comprising a U-shaped member 17 having upwardly extending legs 18, the legs being connected by an upper plate 19 lying in the same plane.

The inner and outer frames 12 and 16 are connected for relative vertical motion by means of an eccentric lever 20 having an arcuate slot 21 and which is pivotally connected eccentric to the slot 21 to lower connecting plate 14 of the outer frame 12 by means of pin 22, a second pin 23 being mounted in the cross plate 19 of inner frame 16 and extending through slot 21 for movement therein. It will be obvious (Figure 1) that when the eccentric lever 20 is rotated in a clockwise direction about its pivot 22, the motion of pin 23 in slot 21 will force cross plate 19 and consequently the whole inner frame assembly 16 upwardly within and with respect to the guide members 13 of the outer frame structure 12.

Secured to the bottom of the U-shaped member 17 of the inner frame structure 16 is a spreader bar 25 having downwardly extending end portions 26 and 27 to which is bolted a cylindrical casing 28. Two braces 30 and 31 are suitably connected to the spreader bar 25 at their lower ends by welding, riveting, etc. and at their upper ends are provided with slot 32 and 33 respectively. Bolts or screws 34 and 35 pass through these slots into the upper ends of legs 13 of the outer frame 12. Thus the braces 30 and 31 provide desirable bracing and reinforcement between the inner and outer frame structures 16 and 12 respectively and also permit relative movement between the two for a distance at least equal to the vertical movement of inner frame 16 within outer frame 12.

A sleeve 38 (Figure 6) having an annular flange 39 is mounted on the member 17 of the inner frame structure 16 for a purpose to be described. Also mounted on the member 17 is a bracket 40 which is forked at its upper end 41 to pivotally receive a charge cut-off operating lever 42 which passes through slots or openings 42' in the legs 18 and 30. A second bracket 43 is provided on the member 17 diametrically opposite the bracket 40 and has pivotally mounted therein a trigger member 44, the lower end of which is adapted to support the trigger end 45 of the cut-off operating lever 42. A suitable trigger actuating rod 46 having an operating handle 47 passes through one of the legs 18 of the U-shaped member 17 as at 48.

Adjacent its pivot in the fork 41 of the bracket 40, the lever 42 has slots 50 in its sides (Figure 1) and is provided with a rectangular opening 51 (Figures 3 and 5) extending vertically therethrough. A tube 53 having a forked connecting portion 54 at its upper end is pivotally connected to the lever 42 by pins 53' engaging in the slots 50. The tube 53 extends downwardly through sleeve 38 (Figure 6) and terminates in a conical cut-off means 52 to be described. Mounted within this tube 53 is a shaft 55 extending downwardly to the conical cut-off means, as will be further described in detail, and carries at its upper end an operating lever 56 in the form of a socket wrench. A pin 55' may support the shaft 55 with respect to the tube 53.

The bottom of the cylindrical casing 28 has integral therewith or rigidly secured thereto a bell mouth section 57 (Figure 1) terminating at its lower end in a cylindrical flange 58 and having an annular flange 59 secured thereto for a purpose to be described. The bell mouth portion 57 extends outwardly and downwardly as at 60 from the cylindrical casing 28 and forms thereunder an annular channel 61 of arcuate cross-section together with a small downwardly extending portion 62 of the casing 28. An endless rubber ring or hose section 63 is provided within this annular channel and cooperates with the upper side of the conical closure 52 to seal the cylindrical casing 28 against leakage of concrete or water therefrom as shown.

It will be apparent that a pull exerted on the control ring 47 will pivot the trigger 44 by means of the rod 46 away from the trigger end 45 of the lever 42 thus removing its support and permitting the tube 53 to drop by gravity and, being rigidly connected to the bottom closure or conical cut-off 52, the cut-off also will drop, thus opening the bottom of cylindrical casing 28. Any material such as concrete within the cylindrical casing 28 will now be discharged therefrom, passing out around the peripheral edges of the conical cut-off which, due to its shape, also acts as a spreader for the flow of concrete.

It is obvious that vertical motion of the tube 53 is accompanied by vertical movement of the shaft 55. Further, this vertical movement of the tube and shaft is with respect to the inner frame 16 and the charging bucket 28. Thus, pressure exerted on the cut-off operating lever 42 moves the cut-off closure 52 vertically with respect to the inner frame while the cam lever 20 moves the entire inner frame assembly vertically with respect to the outer frame 12, the two motions providing for the raising or lowering of the charging bucket on the mold 100 and the opening or closing of the conical cut-off 52.

An important feature of the invention resides in the provision of adjustable arcuate blades or sectors 65 connected to the conical cut-off 52. The conical cut-off 52, as shown in Figures 2, 3 and 4 of the drawings, includes four of these adjustable blades 65 which are connected for relative motion with respect to each other by means of a rivet 66 secured to each plate 65 at one end and adapted to move in an adjoining slot 67 formed in the adjacent end of the adjoining and overlapping blade 65. These blades 65 are confined between a lower plate 70 resembling a hollow truncated cone of low angle such as 10–20° and the lower element 71 of the conical cut-off 52 which is itself integrally or rigidly secured to the bottom end of the tube 53. The blades 65 are confined between the plates 70 and 71 by means of rivets 72 extending through arcuate slots 73 in each of the blades 65. Guide pins 74 extend between the plates 70 and 71 and through arcuate slots 75 provided in each blade 65.

Rigidly connected to the bottom end of the shaft 55 is a plate 76 suitably shaped so as to form a plurality of crank members 76'. Links 77 connect the cranks 76' to the respective blades 65 as at 78 (Figure 2). The plate 70 is stamped or formed so as to provide a sufficient working clearance for the connections of arms 77 with the blades 65 as at 78 (Figure 4). It is apparent that if a short rotary motion in either direction is imparted to shaft 55 by means of the wrench handle 56 mounted on the top thereof, rotation of the member 76 at the bottom of the shaft 55 will be correspondingly affected.

As shown in Figures 1, 2, 3 and 4, the adjustable blades 65 are in their extended position. Consequently, rotation of the member 76 (Figure 2) must be in a counterclockwise direction to effect movement of the blades 65 to their retracted positions. As previously described, all of the slots 73 and 75 are slightly arcuate, the general direction of the former being circumferential while that of the latter is radial. When the crank member 76 is rotated in a counterclockwise direction (Figure 2) the crank 76', by means of the links 77 pivotally connected to the blades 65 at 78, will cause a partial rotation of each blade 65 about the rivet 66 in the adjoining blade combined with an inward sliding movement of each blade 65 guided by the pins or rivets 72 and 74 in their respective slots. Simultaneously each rivet 66 will move in effect toward the other end of the slot 67 in the adjoining blade 65. Thus the blades 65 may be retracted or extended upon rotation of the multi-crank member 76 by means of the wrench 56.

The blades 65 do not merely move radially outward nor do they have a purely circumferential movement but have a combination of these two or a translatory movement so as to result in an effective shearing action as these blades are extended. Each of the blades 65 overlaps the adjoining blade in a step-like relation and their shearing motion going from the retracted to the extended position forces to the side any rough material having a tendency to prevent the blades from closing snugly against the side of the bell mouth 57 of the cylindrical casing 28. It will be noted that the blades 65 have an angular relation with the horizontal so as to form in effect a hollow truncated cone and thus prevent any possibility of the material in the cylindrical casing 28 running into and jamming the sliding blade structure described, as would certainly occur if these blades were in a horizontal plane.

It will now be apparent that discharge of material from the charging bucket 28 into the mold to be referred to may be effected by two methods. By withdrawing the supporting trigger 44 from the trigger end 45 of the lever 42, the tube 53, shaft 55 and conical closure 52 will be permitted to move downwardly by gravity a distance of about two inches. This opens the bottom of the charging bucket 28, and permits the flow of material downwardly past the peripheral edges of the conical cut-off 52 into the mold 100.

After all of the desired amount of material has been discharged the lever 42 may be depressed until its other end 45 is again caught and supported by the trigger 44. This raises the cut-off 52 against the rubber hose 53 to close the discharge opening. However, the opening may be closed by rotating the shaft 55 in the tube 53 by means of the wrench 56 to effect an extension of the blades 65 against the walls 58 of the bell mouth 57 of the charging bucket 28. This, of course, obviates the necessity for raising the cut-off 52.

The second method of discharging material from the bucket 28 is immediately apparent. If the bucket is loaded with its bottom closed by the extended blades 65, it is only necessary to retract the blades to discharge the material. Obviously, the flow may be stopped or the bottom again closed by re-extending the blades 65 or by raising the conical cut-off 52.

The bucket opening or closing means described is highly advantageous in that it assures a maximum of efficiency in operation with respect to the time required for the discharge of any load. When loads of a predetermined amount are to be delivered the bottom is closed or opened by raising or lowering the conical cut-off 52. When the charging bucket contains more than enough material for any one mold, the discharge is preferably arrested by extension of the blades 65, although both methods obviously may be employed.

The apparatus as described is adapted for the charging of molds for pipes having a wall thickness of from two to four inches although, of course, it may be manufactured in any desired size. Pipes having a two inch wall thickness are not usually reinforced although thicker walled pipes contain reinforcing consisting of steel wire mesh. When molding a reinforced pipe having, for example, a four inch wall, the wire mesh is placed in a position equally spaced from the walls of the mold. The concrete is discharged from the bucket 28 into the space between the reinforcement and the outer wall and then slumps through the wire mesh towards the inner wall or core of the mold. By this procedure, segregation and spattering of the concrete is avoided.

In order to provide an even distribution of the mix when delivered from the mixer into the cylindrical casing 28, a distributing wheel 85 having blades 86 integral therewith is mounted on a hub 87 which is supported by a ball bearing assembly 88 secured to the sleeve 38. A second ball bearing assembly 89 is provided in the lower portion of the hub 87 to take up the thrusts due to the cantilever action imposed by the weight of the concrete being deposited from the mixer onto the rotary blades 86 of the distributing wheel 85. The force of the mixture dropping on the rotary plates 86 will cause rotation of the distributing wheel 85 as the concrete mixture passes between the blades 86 into the cylindrical casing 28 as a uniform mix. If desired, the distributing wheel 85 may be provided with means so that it may be manually or power driven. For this purpose, a ring gear 93 is suitably secured to the hub 87 and is designed to mesh with a bevel gear 94 mounted on the end of a horizontal shaft 95 which is supported by a bearing 96 in the supporting arm 26 of the distributor bar 25 and by a hanger bearing 97 suspended directly from the distributor bar 25. Suitable power means or a crank 99 (Figure 1) may be connected to the end of the shaft 95 as desired to provide driving means for the distributing wheel 25.

As seen in Figure 1, the charging apparatus comprising the invention is in proper position on the top of a pipe mold 100 having an inner side 101, an outer side 102 and a core cover 103 for the area enclosed within the inner walls 101. Suitable packing means 104 is provided about the upper edge of the outer side 102 of mold 100 and is adapted to cooperate with the annular flange 59 and the bell mouth portion 58 of cylindrical casing 28 to form a closed joint between the mold 100 and the charging bucket 28.

The operation of the apparatus is as follows:

The mold charging apparatus which is suspended from an overhead trolley (not shown) by means of the bracket 10, is moved to a position adjacent the cement mixing machine and the charge is delivered onto the distributing wheel 85. The charge thus delivered may be the correct amount required to fill a single pipe mold or it may be sufficient to fill several pipe molds.

The mixing and distributing wheel 85 and its blades 86 serve the important functions of maintaining a uniform distribution of aggregates in the mass and of distributing the mass evenly within the bucket 28 as it is discharged thereon from the mixer. Although as previously described, the distributing wheel 85 may be power or hand driven, the weight of the mixture being discharged from the mixer onto the blades 86 results in a rotation of the distributing wheel 85, the concrete mix passing between the blades which, due to their forced rotation evenly distribute the concrete within the bucket 28. Thus the concrete mix is discharged from the mixer onto and through the blades 86 and is deposited in a smooth even mass within the bucket 28 with a minimum tendency of the cement to separate from the aggregate.

The mold charging apparatus is then moved to a position directly over and a few inches above any pipe mold 100. The cam lever 20 is now rotated in a counterclockwise direction thus lowering the mold charging bucket 28 to the top of the pipe mold 100 so that the annular flange 59 of the bell mouth 57 of the charging bucket rests on the packing 104 on the upper edge of the outer side 102 of the pipe mold 100. The apparatus is now ready (Figure 1) for the discharge of the contents of the bucket 28 into the space between the sides 101 and 102 of the pipe mold 100.

When the charging bucket 28 has been filled from the mixer with a charge of a predetermined amount only sufficient to fill one pipe mold, this predetermined amount is delivered into the mold from the bucket 28 by permitting the conical bottom closure or cut-off 52 of the bucket 28 to move downwardly so that the width of the opening between the bottom closure and the side wall of the bucket 28 is equal to the thickness of the pipe being molded, for example, a distance of two inches. The lowering of conical bottom closure of cut-off 52 is accomplished by a pull on ring 47 which moves trigger 44 away from the trigger end of lever 42, permitting the load of the concrete mix on the conical surface 52 to pull lever 42 downwardly about the pivot 41, thus opening the bottom closure or cut-off 52 with respect to the side walls of the bucket 28. It should be noted that the shear blades 65 on the bottom of conical cut-off 52 are retracted during this operation, and not extended as shown in Figure 1, for the discharge of predetermined amounts of concrete into the mold.

The bottom closure 52 having moved downwardly with respect to the side wall 62 of the bucket 28 and the rubber hose 63 therein, the concrete mix will flow by gravity between the walls 101 and 102 of the mold 100 in the form of an unbroken circular wall thus emptying the bucket 28. The bottom of the bucket 28 may now be closed by depressing lever 42 until the trigger 44 again moves under the trigger arm 45 of lever 42 to support the same in its bottom closing position. The mold charging apparatus is now moved back to the mixer to receive another predetermined charge which is delivered to the next pipe mold in like fashion.

As the bucket 28 of the mold charging apparatus may be of any desired capacity it may hold a sufficient charge to fill a number of pipe molds. When the bucket 28 contains a sufficient charge to fill several pipe molds, the apparatus is moved into position over the first pipe mold and the bucket 28 is lowered thereon as previously described. Two methods described may now be employed for cutting off the flow of the concrete mix after the first pipe mold has been filled.

The first method is quite similar to that for discharging concrete mix into the mold already described. The supporting trigger 44 is withdrawn from under the trigger end 45 of lever 42 and the conical cut-off 52 of the bucket 28 is now opened by the weight of the concrete mix in the bucket. When the mold has been filled, the cut-off 52 is closed to arrest flow of the balance of concrete mix from the bucket 28 by exerting pressure downwardly on lever 42 so that the supporting trigger 44 will again lock the trigger end 45 of the lever 42 in the closed position.

While the above described method of cutting off the flow of concrete mix is entirely practical, the preferred method of cutting off the flow of concrete from bucket 28 after a mold has been filled, resides in the use of the shear blades 65. As the first mold is filled a short rotary movement is given to the wrench 56 on the upper end of shaft 55 so as to rotate the multicrank member 76 which by means of its connecting links 77 with the shear blades 65 forces the blades outwardly in the shearing motion previously described so that the peripheral edges of each of the blades 65 shears or plows its way through the discharging material to fit snugly against the inner side of the bell mouth extension 57 of the bucket 28. The bucket is now raised from its position on the upper end of the pipe mold 100 by manually rotating the lever 29 in a clockwise direction (Figure 1) and the mold charging apparatus is then moved into position over the next mold to be filled and the operation is repeated. If, after the filling of several molds it is found that the remainder of the concrete in the charging bucket 28 is insufficient to fill an additional mold, the mold charging apparatus is moved back to the mixer to receive a new charge.

It will be apparent, that if the cut-off 52 is lowered to open the bottom of the charging bucket 28 so that the width of the opening between the cut-off 52 in the sides 62 of the bucket 28 is equal to the space between the walls 101 and 102 of the mold 100, the charging of the mold will proceed with a maximum of speed and efficiency.

Likewise if the opening in the bottom of the charging bucket is less than the opening between the two walls of the mold it will be apparent that the charging rate of the bucket 28 will be decreased. It is obvious that it is possible by manual pressure on the lever 42 to most efficiently regulate the flow of concrete mix from the charging bucket 28 into the mold 100.

It will be further apparent that the rate of flow from the bucket 28 into the mold 100 may be regulated by the position of the shearing blades 65 with respect to the inside wall of the bell mouth 57 of the charging bucket 28. Thus if the cut-off 52 has been moved to its lower limit of movement and the shear blades 65 are in a retracted position, a maximum speed of charging of the mold from the charging bucket 28 is possible. Obviously, by extending the positions of the shear blade 65 by rotation of the wrench 56, the effective opening between the ends of the partially extended shear blades 65 and the inner walls of the bell mouth 57 will be correspondingly decreased, and a regulation of the flow is again obtained.

It will now be apparent that the mold charging apparatus described provides a simple and highly efficient means of discharging concrete mix into molds in predetermined amounts or as desired. Moreover, due to the compact mass of concrete mix within the charging bucket 28, provided by the distributing wheel 85, a highly desirable unbroken wall of a uniform concrete mix will flow past the lower open cut-off 52 of the bucket 28.

The advantages of such construction and operation are many, including the speed of operation, the elimination of losses of material due to spattering or leakage during discharge, and elimination of the loss of water from the mix in the bucket between actual mold charging operations. It will be apparent that the mold charging apparatus as herein described and illustrated provides a well braced structure of ample sturdiness so as to provide long life therefor with a minimum of moving parts to require maintenance.

Although the apparatus is described and illustrated in connection with the molding of concrete pipes, it is obvious that its applications may be widespread insofar as the type of material and molds used are concerned. It also will be apparent that the invention is not limited to use in connection with circular or cylindrical molds since obviously, within the scope of the invention, the apparatus may be made of any desired shape for use in connection with molds for making articles of various cross-sectional shapes such as rectangular, elliptical, etc.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A mold charging apparatus comprising a casing having an annular shoulder and an enlarged lower section therebelow, a vertically movable bottom engageable with said shoulder, means carried by said casing to effect vertical movement of said bottom toward and away from said shoulder, and additional means connected to said bottom whereby the size of the opening between said bottom and said enlarged section may be adjusted.

2. A mold charging apparatus comprising a casing having an annular shoulder and an enlarged lower section therebelow, a bottom closure for said casing mounted for vertical movement with respect toward said shoulder, and away from said shoulder to open position, means carried by said casing for receiving a charge of material therefor, means mounted on said casing for moving said closure to open position to discharge said material, and extensible means connected to said bottom and constructed and arranged to vary the space between said bottom and said enlarged section to vary said discharge.

3. A mold charging apparatus comprising a pair of frames, a casing secured to one of said frames, and means connecting said frames for relative vertical motion, said means comprising a cam lever pivotally mounted on one of said frames, an arcuate slot in said lever, and a pin mounted in the other of said frames, said pin being arranged for motion in said slot to effect relative motion of said frames upon rotation of said cam lever.

4. A mold charging apparatus comprising a casing having an enlarged bottom wall section, a shoulder being formed in said casing at the upper end of said enlarged section, a vertically movable bottom for said casing adapted to engage said shoulder, adjustable plates connected to said bottom, means mounted on said casing to effect vertical movement of said bottom downwardly from said shoulder to open position, and means constructed and arranged to extend said plates to a position to cooperate with the enlarged wall section of said casing to effect a closure of the lower end thereof.

5. A mold charging apparatus comprising a casing having an enlarged bottom wall section, a shoulder being formed in said casing at the upper end of said enlarged section, a conical bottom for said casing mounted for vertical movement with respect thereto and constructed and arranged to engage said shoulder to effect a closure for said casing, means for moving said bottom downwardly to open position, and means connected to said bottom to close the lower end of said casing, said latter means comprising blades forming a truncated hollow cone constructed and arranged to move with respect to said bottom to effect an increase in the effective size thereof for engagement with said enlarged bottom wall section.

6. An apparatus for charging a mold with a wet cementitious mix, comprising a casing having an annular shoulder and an enlarged section therebelow, a bottom for said casing constructed and arranged to be spaced from said shoulder and form an annular opening therewith, and means connected to said bottom to vary the flow of mix from said opening, said means comprising conical blade sectors below said shoulder and within said enlarged section and constructed and arranged to move with respect to said bottom to vary the space between said sectors and said enlarged section.

7. A mold charging apparatus comprising a casing having an annular shoulder, a vertically movable bottom for said casing having a portion adapted to cooperate with said shoulder to form a closure for the lower end of said casing, means for effecting vertical movement of said bottom to move said portion thereof between open and closed positions, said casing having an enlarged portion extending downwardly from said shoulder, and means carried by said bottom and operable independently of said portion thereof to engage the downwardly extending portion of said casing to form an auxiliary closure therefor.

8. A mold charging apparatus comprising a casing having an annular shoulder, a vertically movable bottom for said casing having a portion adapted to cooperate with said shoulder to form a closure for the lower end of said casing, means for effecting vertical movement of said bottom to move said portion thereof between open and closed positions, said casing having an enlarged portion extending downwardly from said shoulder, said bottom further comprising a plurality of relatively movable plates below said portion, and means for actuating said plates to move them relatively radially outwardly into engagement with the downwardly extending portion of said casing to form an auxiliary closure therefor.

EDWARD D. BOYLE.